US007274660B2

(12) United States Patent
Hill et al.

(10) Patent No.: US 7,274,660 B2
(45) Date of Patent: Sep. 25, 2007

(54) METHOD OF FLOW CONTROL (75) Inventors: Charles Hill, Gilbert, AZ (US); Rajesh Mangal, Chandler, AZ (US); Ralph Snowden, Gilbert, AZ (US); Harold K. Williamson, Tempe, AZ (US); James Holbrook, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 1134 days.

(21) Appl. No.: 10/222,733

(22) Filed: Aug. 15, 2002

(65) Prior Publication Data

US 2004/0032827 A1    Feb. 19, 2004

(51) Int. Cl.
*H04L 12/26* (2006.01)
*H04J 1/16* (2006.01)
*G08C 15/00* (2006.01)
*G06F 11/00* (2006.01)
*G01R 31/08* (2006.01)

(52) U.S. Cl. .................. 370/229; 370/236; 370/412; 709/235

(58) Field of Classification Search ........ 370/229–236, 370/390–417; 709/230–235
See application file for complete search history.

(56) References Cited

U.S. PATENT DOCUMENTS 5,689,505 A * 11/1997 Chiussi et al. ............. 370/388
6,031,821 A * 2/2000 Kalkunte et al. ........... 370/235
6,115,356 A * 9/2000 Kalkunte et al. ........... 370/229
6,646,985 B1 * 11/2003 Park et al. .................. 370/229
6,721,273 B1 * 4/2004 Lyon .......................... 370/235
6,957,269 B2 * 10/2005 Williams et al. ............ 709/235
6,957,270 B1 * 10/2005 Erimli et al. ............... 709/235
6,980,520 B1 * 12/2005 Erimli ........................ 370/236
6,992,980 B2 * 1/2006 Brezzo et al. .............. 370/229
2001/0055277 A1 * 12/2001 Steely et al. ............... 370/236
2002/0006110 A1    1/2002 Brezzo et al.
2002/0136163 A1 * 9/2002 Kawakami et al. ......... 370/229
2004/0257995 A1 * 12/2004 Sandy et al. ............... 370/235

FOREIGN PATENT DOCUMENTS

WO    WO 01/19039 A1    3/2001

* cited by examiner

*Primary Examiner*—Man U. Phan (57) ABSTRACT

Flow control in a distributed switch fabric (100, 200) includes detecting at least one of a congestion condition (238) in a downstream transceiver port (205) and an oversubscribing condition (257) of a channel buffer (230), where the downstream transceiver port (205) and the channel buffer (230) both correspond to a channel (231) of a traffic manager (208). Packets begin accumulating in the channel buffer (230). Per-flow flow control (254) operates to modify transmission of the packets over the channel (231) to the channel buffer (230) if the channel buffer (230) reaches a threshold value (256). Link level flow control (252) operates transparently to the traffic manager (208) if the congestion condition (238) is detected and the channel buffer (230) fails to reach the threshold value (256).

8 Claims, 5 Drawing Sheets

METHOD OF FLOW CONTROL

BACKGROUND OF THE INVENTION

Advances in high-speed serial interconnects are enabling "mesh" topologies to replace traditional bus-based architectures. Such mesh topologies allow the use of distributed switch fabrics, which offer advantages in cost, scalability, availability and interoperability over bus-based architectures. Also, distributed switch fabrics offer advantages in fault containment over bus-based architectures. For example, each node is responsible for its own traffic. With good flow control, a failure in one node does not impact other nodes. Also, good flow control improves fabric utilization and minimizes packet loss.

Accordingly, there is a significant need for an apparatus and method that improves flow control in a distributed switch fabric.

BRIEF DESCRIPTION OF THE DRAWINGS

Referring to the drawing.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings (where like numbers represent like elements), which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical, electrical, or logical contact. However, "coupled" may mean that two or more elements are not in direct contact with each other, but yet still co-operate or interact with each other.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

There are many topologies for wiring together systems to transport information. The three most common topologies are bus, star and mesh topologies. Bussed topologies use a multi-drop configuration to connect a variety of resources. Busses are usually wide and slow relative to other topologies. Busses rapidly reach a point of diminishing returns, with reliability becoming problematic as any resource on the bus can compromise the integrity of the whole system.

Star topologies use point-to-point connections where each device uses a dedicated link to send/receive data from a central resource. This resource provides the data distribution for the system. Each sub-network is a leg on a star of the next layer in the hierarchy. Star topologies require redundancy to provide reliability. Reliance on a single central resource can cause a loss of all elements below a failure point. A "dual star" topology is often used for high availability applications.

A mesh topology populates point-to-point connections until all nodes have connections to all other nodes. In this configuration, the hierarchy found in a star network disappears. Each point can be an endpoint, a router, or both. Mesh networks can be used as a distributed switch fabric, where each node switches its own traffic. There is no dependence on a central resource, as all nodes are equal in a peer-to-peer system.

Figure 1:
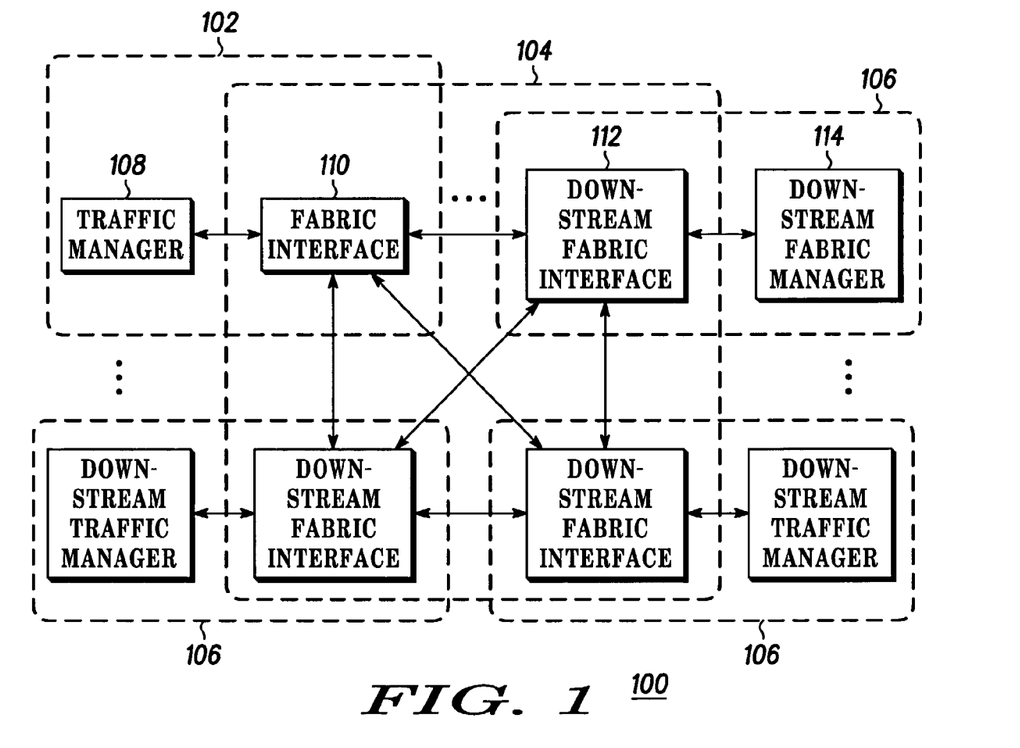
FIG. 1 depicts a block diagram of a distributed switch fabric according to an embodiment of the invention.

FIG. 1 depicts a block diagram of a distributed switch fabric 100 according to an embodiment of the invention. As shown in FIG. 1, the mesh network 104 creates a fully populated, non-blocking fabric. Distributed switch fabric 100 has a node 102 coupled to mesh network 104, in which each node has a direct route to all other nodes and does not have to route traffic for other nodes. Instead of the conventional N×N switch in a star topology, each node in distributed switch fabric 100 uses an M, 1×N switch.

The physical layer of fabric interface 110 for mesh network 104 can use, for example and without limitation, 100 ohm differential transmit and receive pairs per channel. Each channel can use high-speed serialization/deserialization (SERDES) and 8$b$/10$b$ encoding at speeds up to 3.125 Gigabits per second (Gb/s).

Distributed switch fabric 100 can utilize, for example and without limitation, Common Switch Interface Specification (CSIX) for communication between traffic manager 108 and fabric interface 110. CSIX defines electrical and packet control protocol layers for traffic manager 108 and fabric interface 110 to communicate. Packet traffic is then serialized over links suitable for a backplane environment. The CSIX packet protocol encapsulates any higher-level protocols allowing interoperability in an open architecture environment.

Distributed switch fabric 100 can use any network standard for mesh networks 104 in open architecture platforms. For example, in an embodiment distributed switch fabric 100 can use the Compact PCI Serial Mesh Backplane (CSMB) standard as set forth in PCI Industrial Computer Manufacturers Group (PCIMG®) specification 2.20, published by PCIMG, 301 Edgewater Place, Suite 220, Wakefield, Mass. CSMB provides infrastructure for applications such as Asynchronous Transfer Mode (ATM), 3G wireless, other proprietary or consortium based transport protocols, and the like. In another embodiment distributed switch fabric 100 can use an Advanced Telecom and Computing Architecture (AdvancedTCA™) standard as set forth by PCIMG.

As shown in FIG. 1, node 102 is coupled to any number of downstream nodes 106. Each downstream node 106 has its own downstream traffic manager 114 and downstream fabric interface 112. Fabric interface 110 is coupled to each downstream fabric interface 112 via mesh network 104.

Figure 2:
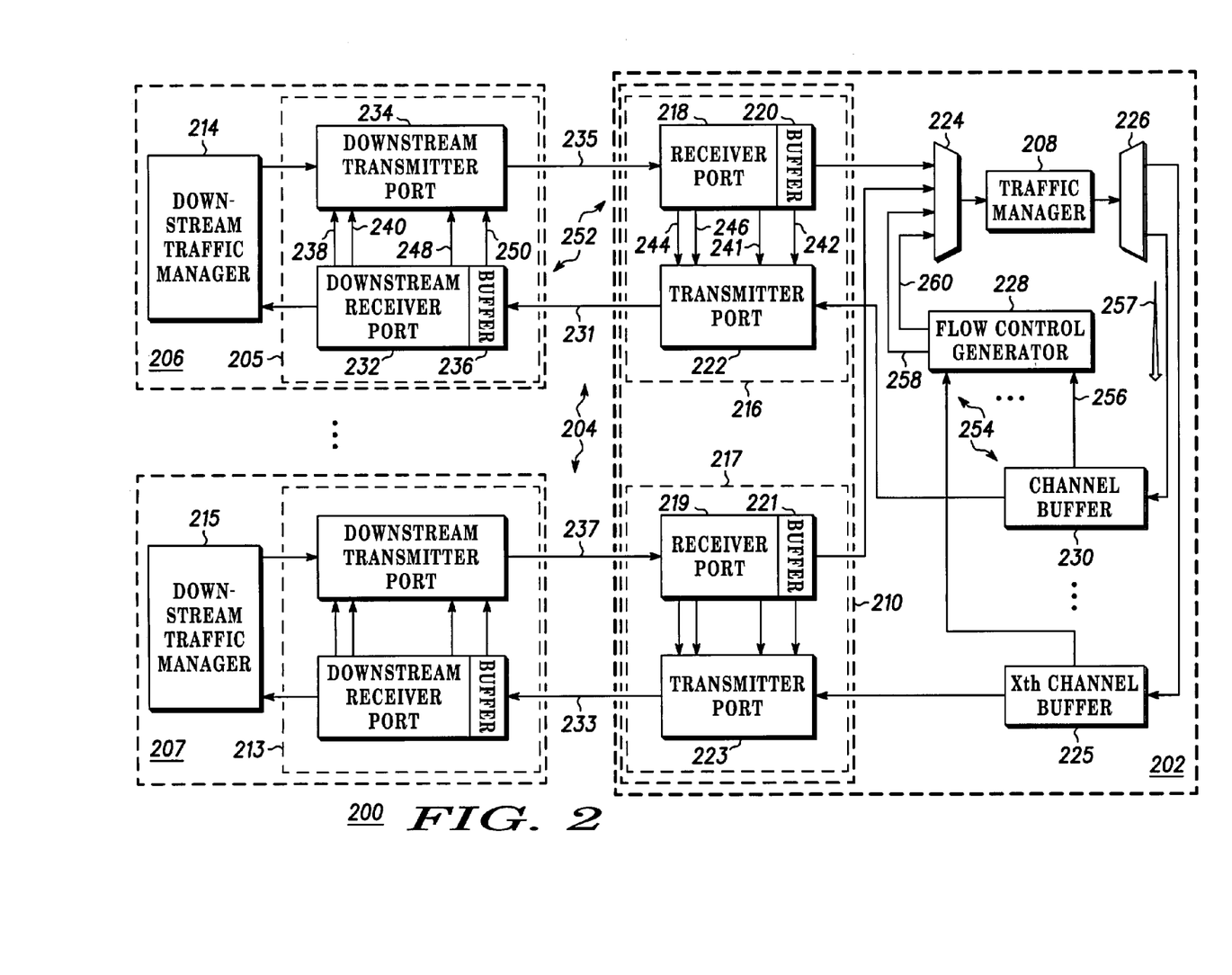
FIG. 2 depicts a more detailed block diagram of a distributed switch fabric according to an embodiment of the invention.

FIG. 2 depicts a more detailed block diagram of a distributed switch fabric 200 according to an embodiment of the invention. As shown in FIG. 2, distributed switch fabric 200 comprises node 202, downstream node 206 and any number of other downstream nodes 207, which may or may not be coupled to mesh network 204. Node 202 has fabric interface 210, which includes transceiver port 216. Fabric interface 210 can also include any number of other transceiver ports 217. Transceiver port 216 is coupled to downstream transceiver port 205 of downstream node 206. Transceiver port 216 and downstream transceiver port 205 communicate over channel 231, 235. Channel 231 is for outgoing packets from node 202 to downstream node 206, and channel 235 is for incoming packets from downstream node 206 to node 202. Communication can include, for example and without limitation, sending/receiving packets of data, link level flow control messages, and the like.

In the embodiment shown in FIG. 2, transceiver port 216 is comprised of transmitter port 222, which is coupled to transmit packets to downstream receiver port 232. Also, transceiver port 216 is comprised of receiver port 218, which is coupled to receive packets from downstream transmitter port 234. Receiver port 218 can include receiver port buffer 220 to store incoming packets from downstream transmitter port 234. Also, downstream receiver port 232 can include downstream receiver port buffer 236 to store incoming packets from transmitter port 222. Receiver port buffer 220 and downstream receiver port buffer 236 can be a First-in-first-out (FIFO) queue, Virtual Output Queue (VOQ), and the like.

Node 202 also comprises traffic manager 208. The function of traffic manager 208 is to collect, classify, modify (if necessary) and transport information, usually in the form of packets, to and from downstream nodes 206 in distributed switch fabric 200. Traffic manager 208 can be, for example and without limitation, a network processor, digital signal processor, and the like. Packets of data are generally intended for use by other devices within node 202 (not shown for clarity). These other devices can include, without limitation, a processor, memory, storage device, and the like.

In an embodiment, traffic manager 208 is coupled to a receive multiplexer 224, which receives packets from transceiver port 216 and other transceiver ports 217 in fabric interface 210. Traffic manager 208 can also be coupled to transmit decoder 226, which receives packets for transmission from traffic manager 208 and distributes to appropriate channels and channel buffers as is known in the art.

Traffic manager 208 controls all traffic for node 202. In effect, traffic manager 208 controls the incoming and outgoing packets for node 202. Traffic manager 208 determines which packets go to which channel and its corresponding transceiver port. To help alleviate any congestion in the transmission of packets, channel 231 includes channel buffer 230 for storing packets to be transmitted in the event transceiver port 216 corresponding to channel 231 cannot transmit packets as fast as traffic manager 208 is able to supply packets to channel 231. Channel buffer 230 is coupled to transmitter port 222 of transceiver port 216. Channel buffer 230 can be a First-in-first-out (FIFO) queue, Virtual Output Queue (VOQ), and the like.

Channel buffer 230 is coupled to flow control generator 228, which is in turn coupled to transmit specialized flow control packets to traffic manager 208 as discussed more fully below. Flow control generator 228 can be used to control packet flow in node 202.

In node 202, all packets of data (i.e. traffic) move between traffic manager 208 and transceiver ports. In the transmit direction, traffic manager 208 performs switching by examining a packet and selecting the correct transceiver port and corresponding channel. The capacity of node 202 is determined by the capacity of traffic manager 208. All packets of data in and out of traffic manager 208 are intended for other devices in node 202, so no additional capacity is necessary.

In a distributed switch fabric 200, transceiver port 216 does not necessarily have to operate at the same capacity as traffic manager 208. Traffic needs to be adequately distributed among the various transceiver ports such that the average traffic (amount of packets processed by traffic manager 208) matches the capacity of traffic manager 208. For example, and without limitation, 1 Gb/s transceiver ports can support a 2.5 Gb/s traffic manager 208. In another example, 2.5 Gb/s transceiver ports can support a 10 Gb/s traffic manager. An advantageous feature of distributed switch fabric 200 is that transceiver ports can each operate at different speeds without necessarily slowing down the mesh network 204.

With a 1-to-N configuration of nodes in distributed switch fabric 200, it is possible for variations in traffic flows to exceed traffic manager 208 capacity and/or transceiver port 216 capacity. This can occur for both receive and transmit traffic where the number of packets received or required to be sent exceeds capacity. Although buffering can alleviate lost data incurred by such traffic peaks, buffering alone is generally not adequate and some sort of flow control is required.

In an embodiment of the invention, link level flow control 252 is implemented between transceiver port 216 and downstream transceiver port 205. Link level flow control 252 is initiated by downstream transceiver port 205 coupled to receive packets over channel 231 from transceiver port 216 assuming transmitter port 222 is sending packets to downstream receiver port 232. When, downstream receiver port 232 detects congestion condition 238 and reports the congestion condition 238 to downstream transmitter port 234. Congestion condition 238 can be, for example, downstream receiver port buffer 236 becoming full, becoming a certain percentage full, and the like. In other words, congestion condition 238 can occur when downstream receiver port buffer 236 becomes full or is imminent danger of becoming full. Downstream transmitter port 234 then reports congestion condition 238 to transceiver port 216, specifically receiver port 218 over channel 235. Receiver port 218 then transmits stop signal 241 to transmitter port 222, where transmitter port 222 is coupled to transmit packets to downstream receiver port 232 over channel 231. Once transmitter port 222 receives stop signal 241, it suspends transmission of packets over channel 231 to downstream transceiver port 205, specifically to downstream receiver port 232. While transmission of packets on channel 231 is suspended, packets can accumulate in channel buffer 230 corresponding to channel 231.

When downstream receiver port buffer 236 empties or falls below a certain level, downstream transceiver port 205 detects a clear condition 240. Specifically, downstream receiver port 232 detects clear condition 240 and reports clear condition 240 to downstream transmitter port 234. Downstream transmitter port 234 then reports clear condition 240 to transceiver port 216, specifically receiver port 218 over channel 235. Receiver port 218 then transmits a start signal 242 to transmitter port 222, where transmitter port 222 is coupled to transmit packets to downstream receiver port 232. Once transmitter port 222 receives start signal 242, it resumes transmission of packets over channel 231 to downstream transceiver port 205, specifically to downstream receiver port 232. Once packet transmission is resumed, channel buffer 230 can empty as packets are transmitted over channel 231.

In the above embodiment, if transceiver port 216 resumes transmission of packets to downstream transceiver port 205 prior to channel buffer reaching a threshold value 256 (discussed below), then transceiver port 216 suspending transmission of packets to downstream transceiver port 205 operates transparently to traffic manager 208. In other words, if link level flow control 252 operating between transceiver port 216 and downstream transceiver port 205 operates without channel buffer 230 becoming too full (reaching a threshold value 256), then link level flow control 252 does not trigger flow control messages to traffic manager 208, and therefore link level flow control 252 operates transparently to traffic manager 208. This has the advantage of not burdening traffic manager 208 with managing short-duration flow control conditions between transceiver port 216 and corresponding downstream transceiver port 205.

Link level flow control 252 can also operate between transceiver port 216 and downstream transceiver port 205, where transceiver port 216 detects congestion condition 244. For example, receiver port 218 can detect congestion condition 244 and report to transmitter port 222. Congestion condition 244 can occur by receiver port buffer 220 becoming full or approaching becoming full as described above. Transmitter port 222 then reports congestion condition 244 to downstream transceiver port 205, specifically, downstream receiver port 232. Then downstream receiver port 232 transmits stop signal 248 to downstream transmitter port 234, which subsequently suspends packet transmission to receiver port 218 over channel 235. The suspension of packet traffic over channel 235 occurs transparently to downstream traffic manager 214 using a downstream channel buffer (not shown for clarity) in a manner analogous to that described above. Detecting clear condition 246 in receiver port buffer 220 and transmitting start signal 250 to downstream transmitter port 234 also can occur as described above.

With link level flow control 252 operating between transceiver port 216 and downstream transceiver port 205, traffic managers in the affected nodes are not burdened with managing these short-duration flow control conditions. This has the advantage of freeing up resources in traffic manager 208. Since each node 202 manages its own traffic, link level flow control 252 also has the advantage when used in distributed switch fabric 200 of not requiring traffic managers in different nodes to work together to resolve flow control issues. This further frees up network resources and increases fabric utilization.

In another embodiment, per-flow flow control 254 operates to allow traffic manager 208 to control packet transmission to channel buffer 230. Channel buffer 230 reaching a threshold value 256, which can occur whenever channel buffer 230 becomes a certain percentage of its capacity, initiates per-flow flow control 254. For example, and without limitation, threshold value 256 can be set at 80% of capacity, 90% of capacity, 100% of capacity, and the like, to suit a given network configuration or operating methodology. Once threshold value 256 is reached, flow control generator 228 detects threshold value 256 and transmits a modify flow control packet 258 to traffic manager 208. Traffic manager 208 then modifies transmission of packets to channel buffer 230. Modify flow control packet 258 can contain information on which channel corresponding to the nearly full channel buffer is involved, along with instructions on how traffic manager 208 is to modify packet transmission to channel buffer 230.

In effect, traffic manager 208 is notified that channel buffer 230 corresponding to channel 231 is at a threshold value 256 and is imminent danger of becoming full. If channel buffer 230 becomes full, traffic manager 208 may not be able to send packets to channel buffer 230 or other channel buffers, such as Xth channel buffer 225. This can result in the condition known as head-of-line (HOL) blocking and can result in packet loss. To prevent HOL blocking and packet loss, traffic manager 208 can modify packet transmission to channel buffer 230.

Different types of packets can be transmitted over channel 231. For example, voice packets, video packets, data packets, and the like. Voice packets are low duty, fixed latency, high priority traffic that must adhere to a specific latency budget, but can tolerate some packet loss. Data packets, can consume large amounts of bandwidth, has very low priority and can also tolerate some packet loss.

In one embodiment, traffic manager 208 can suspend transmission of packets over channel 231 corresponding to channel buffer 230. In another embodiment, traffic manager 208 can prioritize transmission of packets over channel 231. For example, traffic manager 208 can allow low duty, high priority voice traffic through while holding back lower priority packets such as data packets. This will decrease the rate at which channel buffer 230 is filling with packets. In yet another embodiment, traffic manager 208 can throttle transmission of packets over channel 231. In this embodiment, traffic manager 208 merely decreases the rate at which packets are sent to channel buffer without prioritizing them.

When channel buffer drops below threshold value 256, flow control generator 228 detects the falling below threshold value 256 and transmits a resume transmission packet 260 to traffic manager 208. Thereafter, traffic manager 208 can resume normal transmission of packets to channel buffer 230 over channel 231. Resume transmission packet 260 can contain information on which channel corresponding to the nearly full channel buffer is involved, along with instructions to resume transmission of packets, or resume transmission of packets under yet another modified flow control scheme.

Since traffic manager 208 can have a greater capacity than transceiver port 216 as discussed above, an oversubscribing condition 257 of channel 231 can occur where traffic manager 208 attempts to transmit over channel 231 at a higher rate than transceiver port 216 can transmit to downstream transceiver port 205. When this oversubscribing condition 257 occurs, channel buffer 230 begins to fill with packets as transceiver port 216 is already transmitting at capacity. When channel buffer 230 reaches threshold value 256, per-flow flow control occurs as described above with flow control generator 228 detecting threshold value 256 and transmitting modify flow control packet 258 to traffic manager 208. When channel buffer 230 drops below threshold value 256, flow control generator 228 detects this and transmits resume transmission packet 260 to traffic manager 208.

Per-flow flow control 254 on channel 231 operates the same whether it is responding to link level flow control 252 or an oversubscribing condition 257 of channel buffer 230. This has the advantage of preventing HOL blocking. The embodiment of the invention has the further advantage of only involving traffic manager 208 in flow control management if channel buffer 230 reaches threshold value 256, regardless of why channel buffer 230 reaches threshold value 256. In other words, traffic manager 208 is only involved in flow control if link level flow control 252 causes packets to back up in channel buffer 230 such that a threshold value 256 is reached, or if traffic manager creates an oversubscribing condition 257 in channel 231 and corresponding channel buffer 230. This reduces traffic manager 208 overhead, as it does not have to be involved with every flow control situation and does not have to coordinate with other traffic managers. Still another advantage is that per-flow flow control 254 allows traffic manager 208 to modify packet transmission to channel 231 while continuing to transmit normally to other channels, for example channel 233.

As shown in FIG. 2, node 202 can include any number of other transceiver ports 217 with their associated receiver port 219, receiver port buffer 221 and transmitter port 223. Also, other transceiver ports 217 can operate on other channels 233 and be fed by other channel buffers, such as Xth channel buffer 225 shown. Other transceiver port 217 can also be coupled to send/receive packets with other downstream node 207 having other traffic manager 215 and other downstream transceiver port 213. Any number of transceiver ports and downstream transceiver ports are within the scope of the invention.

Link level flow control 252 and per-flow flow control 254 can operate in any nodes of distributed switch fabric 200. Since each node handles its own traffic over its own channels, the invention has the advantage of allowing flow control to be handled by the traffic manager responsible for the channel and not burdening other nodes and traffic managers. While the references to downstream nodes might connote a hierarchical topology within distributed switch fabric 200, it is noted that by definition, distributed switch fabric is not a hierarchy, and link level flow control and per flow control can operate at each node as described.

Figure 3:
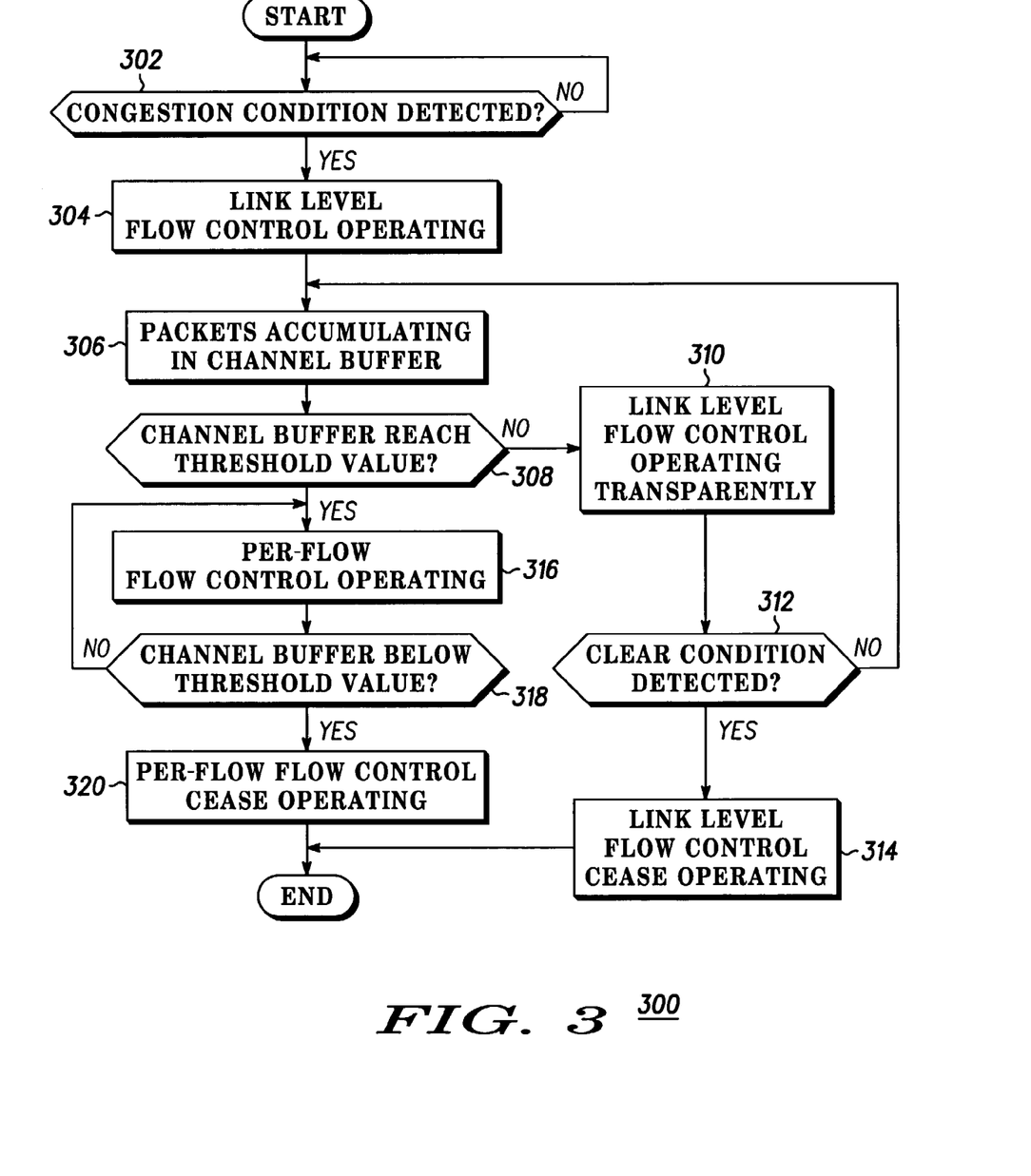
FIG. 3 illustrates a flow diagram of a method of the invention according to an embodiment of the invention.

FIG. 3 illustrates a flow diagram 300 of a method of the invention according to an embodiment of the invention. In step 302, it is determined if congestion condition 238 is detected in downstream transceiver port 205. If so, in step 304 link level flow control 252 operates between transceiver port 216 and downstream transceiver port 205 to alleviate congestion condition 238 in downstream transceiver port 205. Specifically, link level flow control 252 operates to suspend transmission of packets on channel 231 from transceiver port 216 to downstream transceiver port 205.

In step 306, packets accumulate in channel buffer 230 while link level flow control 252 is operating. In step 308, it is determined if channel buffer 230 has reached threshold value 256. If not, link level flow control 252 operates transparently to traffic manager 208 per step 310. In other words, traffic manager 208 is not aware that congestion condition 238 has been detected in downstream transceiver port 205 and that packet transmission over channel 231 from transceiver port 216 to downstream transceiver port 205 has been suspended.

In step 312, it is determined if clear condition 240 has been detected. If not, packets continue to accumulate in channel buffer 230 as illustrated by the return arrow from step 312 to step 306. If clear condition 240 has been detected in step 312, link level flow control 252 ceases operating per step 314 and packet transmission from transceiver port 216 to downstream transceiver port 205 resumes.

If channel buffer 230 has reached threshold value 256 in step 308, per-flow flow control 254 operates to modify transmission of packets over channel 231 to channel buffer 230 per step 316. In an embodiment, flow control generator 228 detects threshold value 256 and transmits modify flow control packet 258 to traffic manager 208. Thereafter, traffic manager 208 modifies packet transmission to channel buffer 230. Operating to modify transmission of packets can include one or more of suspending transmission, prioritizing transmission, throttling transmission of packets, and the like.

In step 318 it is determined if channel buffer 230 is below threshold value 256. If not, per-flow flow control 254 continues to operate as illustrated by the return arrow to step 316. If channel buffer 230 is below threshold value 256, per-flow flow control 254 ceases to operate per step 320. In an embodiment, flow control generator 228 detects channel buffer 230 dropping below threshold value 256 and transmits resume transmission packet 260 to traffic manager 208. Thereafter, traffic manager 208 can resume normal transmission of packets or initiate a new modified packet transmission scheme to channel buffer 230.

Figure 4:
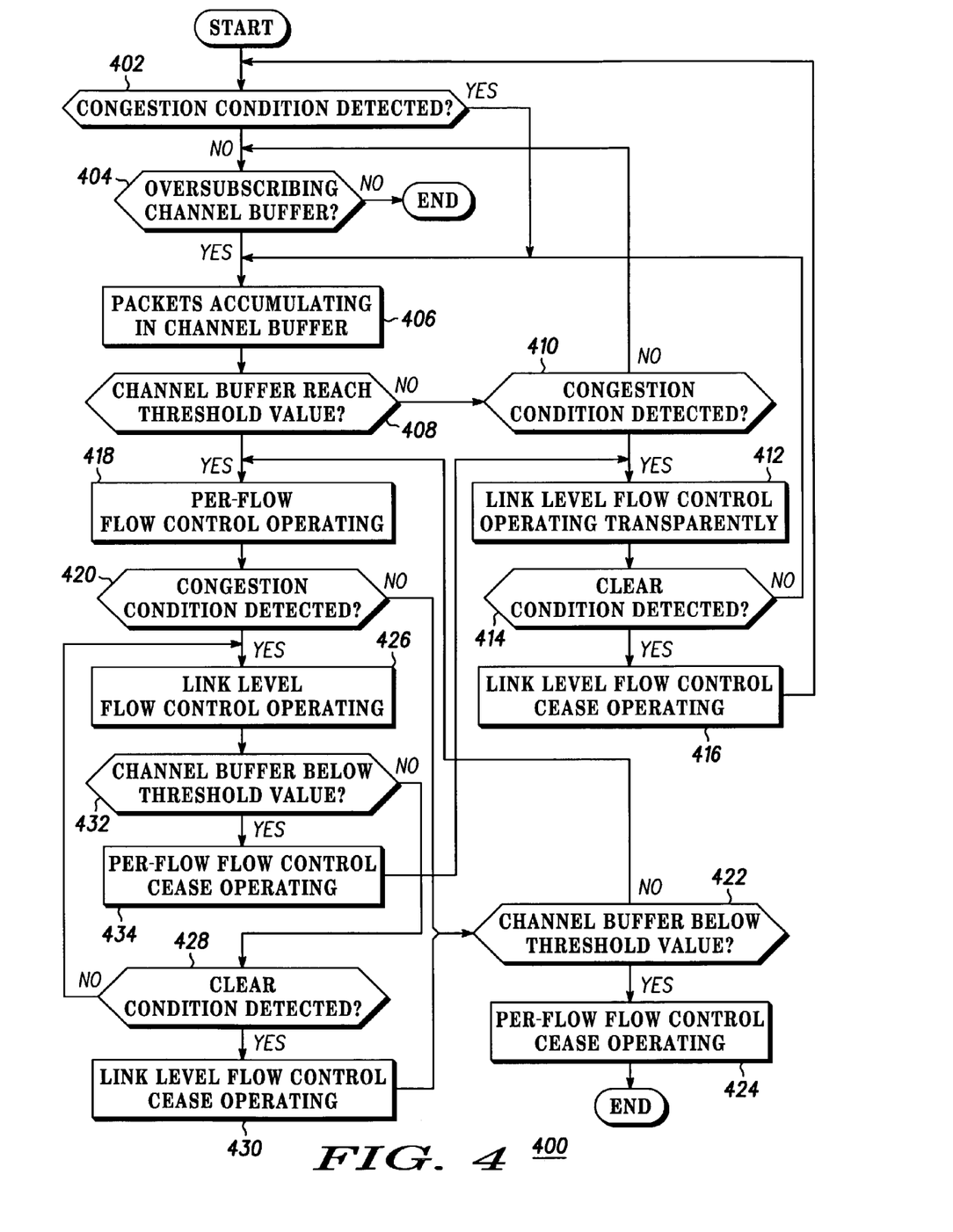
FIG. 4 illustrates a flow diagram of a method of the invention according to another embodiment of the invention.

FIG. 4 illustrates a flow diagram 400 of a method of the invention according to another embodiment of the invention. In step 402, it is determined if congestion condition 238 is detected in downstream transceiver port 205. If not, it is determined if an oversubscribing condition 257 exists in channel buffer 230 per step 404. If one or both of congestion condition 238 and oversubscribing condition 257 exists, packets accumulate in channel buffer 230 per step 406.

In step 408, it is determined if channel buffer has reached threshold value 256. If not, it is determined if congestion condition 238 is detected in downstream transceiver port 205 per step 410. In effect, it is determined if congestion condition 238 is at least one of the causes of packets accumulating in channel buffer 230. If not, then it is determined if an oversubscribing condition 257 exists at channel buffer 230 per the return arrow to step 404. If so, packets continue to accumulate in channel buffer 230 per step 406. If congestion condition 238 is detected per step 410, then link level flow control 252 operates, transparently to traffic manager 208, between transceiver port 216 and downstream transceiver port 205 to alleviate congestion condition 238 in downstream transceiver port 205. Specifically, link level flow control 252 operates to suspend transmission of packets on channel 231 from transceiver port 216 to downstream transceiver port 205.

In step 414, it is determined if clear condition 240 has been detected. If not, packets continue to accumulate in channel buffer 230 as illustrated by the return arrow from step 414 to step 406. If clear condition 240 has been detected in step 414, link level flow control 252 ceases operating per step 416 and packet transmission from transceiver port 216 to downstream transceiver port 205 resumes. In other words, as long as congestion condition 238 is detected and channel buffer 230 has failed to reach threshold value 256, link level flow control 252 operates transparently to traffic manager 208. Even if traffic manager 208 is both creating an oversubscribing condition 257 of channel buffer 230 and congestion condition 238 exists, if threshold value 256 has not been reached, then traffic manager 208 is unaware of packets accumulating in channel buffer 230. Therefore, until threshold value 256 is reached, traffic manager 208 does not have the additional overhead of dealing with a transient or short-duration flow control situation, regardless of the reason for packets accumulating in channel buffer 230. Once link level flow control 252 ceases in step 416, the process begins again by querying for congestion condition 238 and oversubscribing condition 257 as illustrated by the return arrow from step 416 to step 402.

If channel buffer 230 has reached threshold value 256 in step 408, per-flow flow control 254 operates to modify transmission of packets over channel 231 to channel buffer 230 per step 418. In an embodiment, flow control generator 228 detects threshold value 256 and transmits modify flow control packet 258 to traffic manager 208. Thereafter, traffic manager 208 modifies packet transmission to channel buffer 230. Operating to modify transmission of packets can include one or more of suspending transmission, prioritizing transmission, throttling transmission of packets, and the like.

In step 420, it is determined if congestion condition 238 is detected in downstream transceiver port 205. If not, then it is determined if channel buffer 230 is below threshold value per step 422. If so, per-flow flow control 254 ceases operating per step 424. In an embodiment, flow control generator 228 detects channel buffer 230 dropping below threshold value 256 and transmits resume transmission packet 260 to traffic manager 208. Thereafter, traffic manager 208 can resume normal transmission of packets or initiate a new modified packet transmission scheme to channel buffer 230. If channel buffer 230 is not below threshold value 256 in step 422, then per-flow flow control 254 continues to operate as illustrated by the return arrow from step 422 to step 418. If congestion condition is not detected in step 420, it is likely that channel buffer 230 reaching threshold value 256 is due to an oversubscribing condition 257 of channel 231.

If it is determined that congestion condition 238 is at least one of the causes of channel buffer 230 accumulating packets per step 420, then link level flow control 252 operates per step 426. In step 432 it is determined if channel buffer 230 is below threshold value 256. If so, then per-flow flow control 254 ceases operating per step 434. In an embodiment, flow control generator 228 detects channel buffer 230 dropping below threshold value 256 and transmits resume transmission packet 260 to traffic manager 208. Thereafter, traffic manager 208 can resume normal transmission of packets or initiate a new modified packet transmission scheme to channel buffer 230. With per-flow flow control 254 off, link level flow control can operate transparently to traffic manager per step 412 as illustrated by the arrow from step 434 to step 412. Steps 414 and 416 then operate as described above.

If channel buffer 230 is not below threshold value 256 in step 432, then it is determined if clear condition 240 is detected per step 428. If not, then link level flow control 252 continues to operate as illustrated by the return arrow from step 428 to step 426. In this case both link level flow control 252 and per-flow flow control 254 are operating.

If a clear condition exists in step 428, then link level flow control 252 ceases operating per step 430 and packet transmission from transceiver port 216 to downstream transceiver port 205 resumes. In this case, link level flow control 252 is off and per-flow flow control 254 continues to operate.

In step 422, it is determined if channel buffer is below threshold value. If so, per-flow flow control 254 ceases operating per step 424. In an embodiment, flow control generator 228 detects channel buffer 230 dropping below threshold value 256 and transmits resume transmission packet 260 to traffic manager 208. Thereafter, traffic manager 208 can resume normal transmission of packets or initiate a new modified packet transmission scheme to channel buffer 230. If channel buffer 230 is not below threshold value 256 in step 422, then per-flow flow control 254 continues to operate as illustrated by the return arrow from step 422 to step 418.

Figure 5:
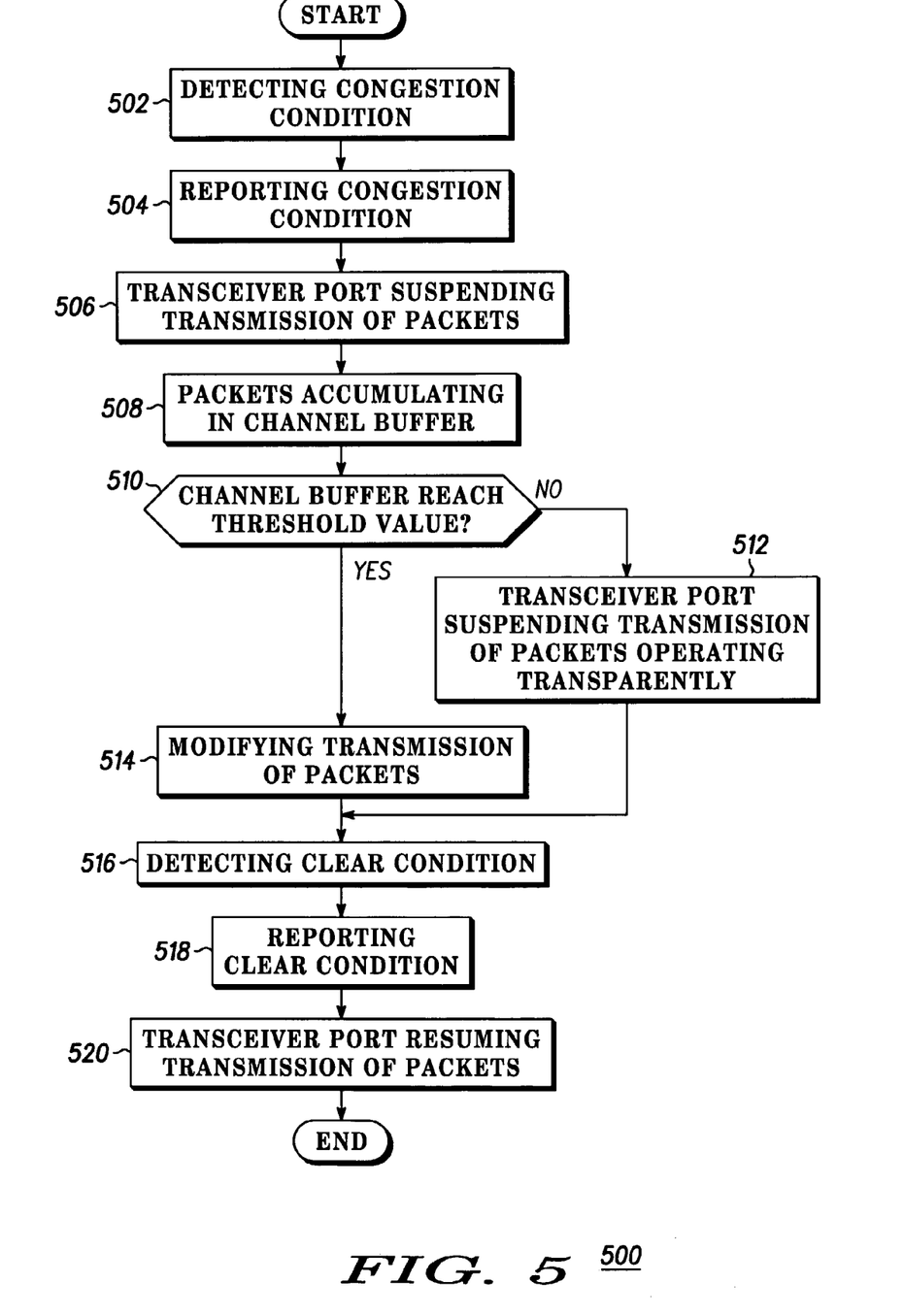
FIG. 5 illustrates a flow diagram of a method of the invention according to yet another embodiment of the invention.

FIG. 5 illustrates a flow diagram 500 of a method of the invention according to yet another embodiment of the invention. In step 502, a congestion condition 238 is detected in downstream transceiver port 205. In an embodiment, downstream receiver port 232 detects congestion condition 238 due to downstream receiver port buffer 236 becoming full or nearly full as described above. In step 504, congestion condition 238 is reported. In an embodiment, congestion condition 238 is reported from downstream receiver port 232 to downstream transmitter port 234. Subsequently, congestion condition 238 is reported by downstream transmitter port 234 to receiver port 218.

In step 506, transceiver port 216 suspends transmission of packets over channel 231 to downstream transceiver port 205. In an embodiment, suspending transmission of packets includes receiver port 218 transmitting stop signal 241 to transmitter port 222 and transmitter port 222 suspending packet transmission to downstream receiver port 232 over channel 231.

In step 508, packets accumulate in channel buffer 230, where channel buffer 230 corresponds to channel 231. In step 510, it is determined if channel buffer 230 has reached threshold value 256. If not, transceiver port 216 suspending transmission of packets as described above occurs transparently to traffic manager 208 per step 512. In other words, traffic manager 208 is not aware that congestion condition 238 has been detected in downstream transceiver port 205 and that packet transmission over channel 231 from transceiver port 216 to downstream transceiver port 205 has been suspended.

If channel buffer has reached threshold value in step 510, then traffic manager 208 modifies transmission of packets to channel buffer 230. In an embodiment, flow control generator 228 detects threshold value 256 and transmits modify flow control packet 258 to traffic manager 208. Thereafter, traffic manager 208 modifies packet transmission to channel buffer 230. Operating to modify transmission of packets can include one or more of suspending transmission, prioritizing transmission, throttling transmission of packets, and the like.

In step 516, clear condition 240 is detected in downstream transceiver port 205. In an embodiment, downstream receiver port 232 detects clear condition due 240 to downstream receiver port buffer 236 emptying as described above. In step 518, clear condition 240 is reported. In an embodiment, clear condition 240 is reported from downstream receiver port 232 to downstream transmitter port 234. Subsequently, clear condition 240 is reported by downstream transmitter port 234 to receiver port 218.

In step 520, transceiver port 216 resumes transmission of packets over channel 231 to downstream transceiver port 205. In an embodiment, resuming transmission of packets includes receiver port 218 transmitting start signal 242 to transmitter port 222 and transmitter port 222 resuming packet transmission to downstream receiver port 232 over channel 231.

While we have shown and described specific embodiments of the present invention, further modifications and improvements will occur to those skilled in the art. It is therefore to be understood that appended claims are intended to cover all such modifications and changes as fall within the true spirit and scope of the invention.

The invention claimed is:

1. A method of flow control in a distributed switch fabric, the method comprising:
- detecting a congestion condition in a downstream transceiver port coupled to receive packets over a channel from a transceiver port, wherein the downstream transceiver port is comprised of a downstream receiver port and a downstream transmitter port, wherein detecting the congestion condition comprises the downstream receiver port detecting the congestion condition, wherein the transceiver port is comprised of a receiver port and a transmitter port;
- reporting the congestion condition to the transceiver port, and wherein reporting the congestion condition comprises:
  - the downstream receiver port reporting the congestion condition to the downstream transmitter port; and
  - the downstream transceiver port reporting the congestion condition to the receiver port;
- the transceiver port suspending transmission of the packets over the channel to the downstream transceiver port;
- the packets accumulating in a channel buffer of a traffic manager corresponding to the transceiver port;
- if the channel buffer reaches a threshold value, the traffic manager modifying transmission of the packets to the channel buffer;
- the downstream transceiver port detecting a clear condition;
- reporting the clear condition to the transceiver port; and
- the transceiver port resuming transmission of the packets to the downstream transceiver port, wherein if transceiver port resumes transmission of the packets prior to the channel buffer reaching the threshold value, the transceiver port suspending transmission of the packets operates transparently to the traffic manager.

2. The method of claim 1, wherein the transceiver port suspending transmission of the packets comprises the receiver port transmitting a stop signal to the transmitter port and the transmitter port suspending transmission of the packets.

3. A method of flow control in a distributed switch fabric, the method comprising:
- detecting a congestion condition in a downstream transceiver port coupled to receive packets over a channel from a transceiver port, wherein the downstream transceiver port is comprised of a downstream receiver port and a downstream transmitter port, wherein the transceiver port is comprised of a receiver port and a transmitter port;
- reporting the congestion condition to the transceiver port;
- the transceiver port suspending transmission of the packets over the channel to the downstream transceiver port;
- the packets accumulating in a channel buffer of a traffic manager corresponding to the transceiver port;
- if the channel buffer reaches a threshold value, the traffic manager modifying transmission of the packets to the channel buffer;
- the downstream transceiver port detecting a clear condition, wherein detecting the clear condition comprises the downstream receiver port detecting the clear condition;
- reporting the clear condition to the transceiver port, wherein reporting the clear condition comprises:
  - the downstream receiver port reporting the clear condition to the downstream transmitter port; and
  - the downstream transceiver port reporting the clear condition to the receiver port; and
- the transceiver port resuming transmission of the packets to the downstream transceiver port, wherein if transceiver port resumes transmission of the packets prior to the channel buffer reaching the threshold value, the transceiver port suspending transmission of the packets operates transparently to the traffic manager.

4. The method of claim 3, wherein the transceiver port resuming transmission of the packets comprises the receiver port transmitting a start signal to the transmitter port and the transmitter port resuming transmission of the packets.

5. A method of flow control in a distributed switch fabric, the method comprising:
- link level flow control operating between a transceiver port and a downstream transceiver port to alleviate a congestion condition in the downstream transceiver port, wherein the link level flow control suspends transmission of packets on a channel from the transceiver port to the downstream transceiver port if the congestion condition is detected, wherein the downstream transceiver port is comprised of a downstream receiver port and a downstream transmitter port, wherein the transceiver port is comprised of a receiver port and a transmitter port, and wherein the link level flow control operating comprises:
  - the downstream receiver port detecting the congestion condition;
  - the downstream receiver port reporting the congestion condition to the downstream transmitter port;
  - the downstream transceiver port reporting the congestion condition to the receiver port;
  - the receiver port transmitting a stop signal to the transmitter port and the transmitter port suspending transmission of the packets;
- the packets accumulating in a channel buffer if the congestion condition is detected;
- per-flow flow control operating to modify transmission of the packets over the channel to the channel buffer if the channel buffer reaches a threshold value; and
- link level flow control operating transparently to a traffic manager if the congestion condition is detected and the channel buffer fails to reach the threshold value.

6. A method of flow control in a distributed switch fabric, the method comprising:
- link level flow control operating between a transceiver port and a downstream transceiver port to alleviate a congestion condition in the downstream transceiver port, wherein the link level flow control suspends transmission of packets on a channel from the transceiver port to the downstream transceiver port if the congestion condition is detected, wherein the downstream transceiver port is comprised of a downstream receiver port and a downstream transmitter port, wherein the transceiver port is comprised of a receiver port and a transmitter port, and wherein the link level flow control operating comprises:
  - the downstream receiver port detecting a clear condition;

the downstream receiver port reporting the clear condition to the downstream transmitter port;

the downstream transceiver port reporting the clear condition to the receiver port;

the receiver port transmitting a start signal to the transmitter port and the transmitter port resuming transmission of the packets;

the packets accumulating in a channel buffer if the congestion condition is detected;

per-flow flow control operating to modify transmission of the packets over the channel to the channel buffer if the channel buffer reaches a threshold value; and link level flow control operating transparently to a traffic manager if the congestion condition is detected and the channel buffer fails to reach the threshold value.

7. A method of flow control in a distributed switch fabric, the method comprising:

detecting at least one of a congestion condition in a downstream transceiver port and an oversubscribing condition of a channel buffer, wherein the downstream transceiver port and the channel buffer both correspond to a channel of a traffic manager;

packets accumulating in the channel buffer;

per-flow flow control operating to modify transmission of the packets over the channel to the channel buffer if the channel buffer reaches a threshold value; and link level flow control operating transparently to the traffic manager if the congestion condition is detected and the channel buffer fails to reach the threshold value, wherein the link level flow control operates between a transceiver port and the downstream transceiver port to alleviate the congestion condition, wherein the transceiver port corresponds to the traffic manager, and wherein the link level flow control suspends transmission of the packets on the channel from the transceiver port to the downstream transceiver port if the congestion condition is detected.

8. A method of flow control in a distributed switch fabric, the method comprising:

detecting at least one of a congestion condition in a downstream transceiver port and an oversubscribing condition of a channel buffer, wherein the downstream transceiver port and the channel buffer both correspond to a channel of a traffic manager;

packets accumulating in the channel buffer;

per-flow flow control operating to modify transmission of the packets over the channel to the channel buffer if the channel buffer reaches a threshold value, wherein the per-flow flow control operating comprises:

a flow control generator detecting the channel buffer reaching the threshold value and transmitting a modify flow control packet to the traffic manager; and the flow control generator detecting the channel buffer dropping below the threshold value and transmitting a resume transmission packet to the traffic manager; and link level flow control operating transparently to the traffic manager if the congestion condition is detected and the channel buffer fails to reach the threshold value.

\* \* \* \* \*